United States Patent
Kerr, III

(10) Patent No.: US 9,555,735 B2
(45) Date of Patent: Jan. 31, 2017

(54) MOLDED TONNEAU COVER APPARATUS

(71) Applicant: Toyota Motor Engineering & Manufacturing North America, Inc., Erlanger, KY (US)

(72) Inventor: Norman C. Kerr, III, Ann Arbor, MI (US)

(73) Assignee: Toyota Motor Engineering & Manufacturing North America, Inc., Erlanger (KY)

(*) Notice: Subject to any disclaimer, the term of this patent is extended or adjusted under 35 U.S.C. 154(b) by 16 days.

(21) Appl. No.: 14/592,615

(22) Filed: Jan. 8, 2015

(65) Prior Publication Data
US 2016/0200376 A1    Jul. 14, 2016

(51) Int. Cl.
*B60P 7/02*     (2006.01)
*B60J 7/19*     (2006.01)
*B60J 7/14*     (2006.01)

(52) U.S. Cl.
CPC ........ *B60P 7/02* (2013.01); *B60J 7/141* (2013.01); *B60J 7/198* (2013.01); *Y10T 16/547* (2015.01)

(58) Field of Classification Search
CPC .............. B60J 7/14; B60J 7/141; B60J 7/198; B60P 7/02; B62D 33/046; B62D 33/077; E05D 3/06; E05D 3/12; E05D 3/125; E05D 7/009; E05D 9/005; E05D 11/0054; E05D 11/06; E05D 11/10; Y10T 16/533; Y10T 16/547; Y10T 16/551
See application file for complete search history.

(56) References Cited

U.S. PATENT DOCUMENTS

| | | | | |
|---|---|---|---|---|
| 179,987 A | * | 7/1876 | Wilson, Jr. ............... | E05D 11/06 16/374 |
| 401,086 A | * | 4/1889 | Turner ...................... | E05D 3/12 16/366 |
| 563,133 A | * | 6/1896 | Cabaret ................... | E05D 11/06 12/136 R |

(Continued)

FOREIGN PATENT DOCUMENTS

| | | | | |
|---|---|---|---|---|
| AU | WO 2008090447 A2 | * | 7/2008 | ......... E05B 65/0085 |
| DE | 9308439 U1 | * | 8/1993 | ........... E05D 15/242 |

(Continued)

*Primary Examiner* — Glenn Dayoan
*Assistant Examiner* — Paul Chenevert
(74) *Attorney, Agent, or Firm* — Christopher G. Darrow; Darrow Mustafa PC

(57) ABSTRACT

A vehicle cargo box tonneau cover device includes two or more hard panels formed of thin-walled, friction welded polypropylene material hermetically enclosing extruded support beams. Each panel forms an upper surface falling on a common plane when in a deployed position. Adjacent panels are joined along their common edges by a multi-pin hinge disposed entirely below the upper surface to provide a flat overall appearance. The hinge has a first flange carried by a first panel, a second flange carried by an adjacent second panel, and an elongated free-moving link mounted to the first flange for relative rotation about a first axis and mounted to the second flange for relative rotation about a second axis. The two axes are spaced from and parallel to one another, whereby the hinge enables 180° freedom of rotation between the adjacent panels when transitioning between a planer deployed position and a folded retracted position.

21 Claims, 8 Drawing Sheets

(56) References Cited

U.S. PATENT DOCUMENTS

| | | | | |
|---|---|---|---|---|
| 2,642,018 A | * | 6/1953 | Weeber | A01G 9/241 16/365 |
| 3,183,548 A | * | 5/1965 | Speakman | E05D 3/12 16/366 |
| 3,570,579 A | * | 3/1971 | Matsushima | A47B 17/04 16/366 |
| 3,578,378 A | * | 5/1971 | Anderson | B60J 7/141 296/100.04 |
| 4,351,555 A | * | 9/1982 | Hashimoto | B60R 5/044 16/366 |
| 4,762,360 A | * | 8/1988 | Huber | B60P 7/02 292/DIG. 29 |
| 4,824,162 A | * | 4/1989 | Geisler | B60J 7/041 16/269 |
| 4,844,531 A | * | 7/1989 | Kooiker | B60J 7/041 296/100.09 |
| 4,861,092 A | * | 8/1989 | Bogard | B60J 7/141 296/100.09 |
| 4,953,261 A | * | 9/1990 | Lyons | A47K 3/36 16/320 |
| 5,049,274 A | * | 9/1991 | Leason | B01D 35/0273 156/73.1 |
| 5,104,175 A | * | 4/1992 | Enninga | B60P 7/02 296/100.1 |
| 5,427,428 A | * | 6/1995 | Ericson | B60J 7/141 160/231.1 |
| 5,460,423 A | | 10/1995 | Kersting et al. | |
| 5,636,893 A | | 6/1997 | Wheatley et al. | |
| 5,664,822 A | * | 9/1997 | Rosenfield | B60R 13/01 16/250 |
| 5,682,643 A | * | 11/1997 | Duffy | E05D 3/12 16/225 |
| 5,782,282 A | * | 7/1998 | Chen | E05D 3/12 16/250 |
| 5,857,729 A | | 1/1999 | Bogard | |
| 6,227,602 B1 | * | 5/2001 | Bogard | B60J 7/141 296/100.06 |
| 6,290,441 B1 | | 9/2001 | Rusu | |
| 6,817,325 B2 | * | 11/2004 | Dinkel | F01L 9/02 123/90.12 |
| 6,877,695 B2 | * | 4/2005 | Eveker | B64C 1/14 244/129.5 |
| 6,899,372 B1 | * | 5/2005 | Keller | B60J 7/141 296/100.06 |
| 7,350,609 B2 | * | 4/2008 | Udo | B60K 11/04 180/68.4 |
| 7,484,788 B2 | * | 2/2009 | Calder | B60J 7/141 296/100.01 |
| 7,500,713 B2 | * | 3/2009 | Riley | B62D 33/046 296/186.1 |
| 7,537,264 B2 | * | 5/2009 | Maimin | B60J 7/141 296/100.06 |
| 8,348,328 B2 | * | 1/2013 | Walser | B60J 7/141 296/100.09 |
| 8,585,120 B2 | * | 11/2013 | Rusher | B60J 7/141 296/100.09 |
| 8,641,124 B1 | | 2/2014 | Yue | |
| 8,960,765 B2 | * | 2/2015 | Facchinello | B60J 7/141 296/100.06 |
| 9,004,571 B1 | * | 4/2015 | Bernardo | B60J 7/141 296/100.03 |
| 9,039,066 B1 | * | 5/2015 | Yue | B60P 7/02 296/100.09 |
| 9,267,261 B2 | * | 2/2016 | Royer | E02D 29/14 |
| 9,421,851 B2 | * | 8/2016 | Kerr, III | B60J 7/141 |
| 2002/0063438 A1 | | 5/2002 | Rusu | |
| 2002/0145299 A1 | | 10/2002 | Henderson | |
| 2004/0108746 A1 | | 6/2004 | Elliott | |
| 2008/0036234 A1 | | 2/2008 | Yokoyama et al. | |
| 2008/0129077 A1 | | 6/2008 | Weldy | |
| 2009/0139167 A1 | * | 6/2009 | Donaldson | B62D 33/046 52/272 |
| 2009/0236870 A1 | * | 9/2009 | Duncan | B60J 7/20 296/136.04 |
| 2012/0274091 A1 | | 11/2012 | Yue | |
| 2013/0114997 A1 | | 5/2013 | Yue | |
| 2013/0341960 A1 | | 12/2013 | Garska | |
| 2014/0042754 A1 | | 2/2014 | Spencer | |
| 2015/0054300 A1 | * | 2/2015 | Shi | B60J 7/141 296/100.09 |
| 2016/0186475 A1 | * | 6/2016 | Moore | E05D 11/06 16/374 |

FOREIGN PATENT DOCUMENTS

| | | | | |
|---|---|---|---|---|
| DE | 202012102701 | * | 8/2012 | E05D 3/12 |
| FR | 1296112 A | * | 6/1962 | B60J 7/041 |
| NL | 1008182 C2 | * | 8/1999 | E05D 15/165 |

* cited by examiner

MOLDED TONNEAU COVER APPARATUS

TECHNICAL FIELD

The present disclosure relates to a cover for an open-topped bed of a motor vehicle, and a rigid tonneau cover system for pick-up trucks in particular.

BACKGROUND

A motor vehicle such as a pick-up truck typically employs an open-topped cargo bed suitable to carry various cargos. Generally, the cargo bed is covered by a tonneau cover which is releasably clamped to and extended above the cargo bed, so as to protect the carried cargos from adverse weather and improve the overall aesthetic appearance of the pick-up truck. Tonneau covers can be classified into hard-top types and soft-top types, wherein the hard-top type tonneau cover has a rigid cover portion typically constructed of metal, fiberglass or the like, while the soft-top type tonneau cover has a soft cover portion typically constructed of canvas, vinyl or a weather-resistant fabric.

In general, although the hard-top tonneau cover provides greater security for cargo and can be more easily clamped on the cargo bed of the pick-up truck, it tends to be heavier than the soft-top tonneau cover, and needs more storage space for storing the hard-top tonneau cover after being removed from the pick-up truck. Furthermore, the soft-top tonneau cover is lighter in weight, and the volume thereof is more compact for storage. Meanwhile, both the hard-top tonnneau cover and the soft-top tonneau cover need to provide clamps for securely clamping the tonneau cover to the pick-up truck.

Tonneau cover systems have been used for a number of years to cover the cargo boxes of pick-up trucks against dirt, debris, and other environmental contaminants and to improve the aesthetic quality thereof. Current tonneau cover systems often employ a soft, often rollable, cover or a hard, often foldable, cover material as the main covering means. In some applications, a hook-and-loop fastening system can couple between the soft tarp of the tonneau cover and the side walls of the cargo box of the pick-up truck. This arrangement permits the tarp to be coupled to the cargo box to conceal the contents thereof or, alternatively, to be rolled up or otherwise removed to reveal the contents of the cargo box of the pick-up truck.

In many applications, a rail system is used that couples to the side walls of the cargo box of the pick-up truck. This rail system may serve as a convenient attachment system for coupling the cover to the cover box. However, in many conventional applications, the connection system that permits connection of the cover to the side rails and thus, to the side walls of the cargo box can be cumbersome or require complex attachment and/or detachment processes. Moreover, in some conventional applications, the connection system may prevent or inhibit access to the front or header portion of the cargo box. That is, in some applications, the cover must be removed from the rear first before unlatching in a forward direction (relative to the vehicle). Although there have been attempts to provide access to the front or header portion of the cargo box direction in some tonneau cover systems, these attempts have not always provided convenient access while simultaneously providing sufficient retention when closed. In fact, in some applications, retention may not provide longitudinal, transverse and vertical restraint (relative to the vehicle). Still further, in some applications, attachment of the header can involve a cumbersome process of engaging clamps or other retention systems that are difficult and subject to failure.

Accordingly, there exists a need in the relevant art to provide a tonneau cover system capable of overcoming the disadvantages of the prior art. Additionally, there exists a need in the relevant art to provide a tonneau cover system, and in particular a latch mechanism and associated rail and striker assembly capable of quickly, simply, and reliably coupling the header portion of the tonneau cover system to the vehicle. In some embodiments, this latch mechanism can further aid in retaining the header portion in all three degrees of direction (longitudinal, transverse and vertical) and can permit varied adjustment and/or space accommodation in the vertical direction.

Slam-action latches are known in the art and are employed in a number of applications. Generally latches coming within this category operate by forcing a pawl into engagement with a keeper. For example, when a first panel member has a pawl and a second panel member, such as, for example, a cabinet, has a keeper thereon slamming shut the first panel member against the second panel member secures the panels.

In many cases, doors of vehicles, particularly those associated with the back open end of a pick-up truck need to be secured so that when the vehicle is operating, the door will not become detached. A loose or detached door can cause the contents of the pick-up truck bed to escape and further can damage the truck bed lining if repeated slamming of the door occurs. A latch is needed which will secure the pick-up truck back-end cover securely, and which can be readily actuated to release the door to thereby provide access to the pick-up truck bed.

SUMMARY

According to the present disclosure, a foldable, hard panel tonneau cover apparatus for an open-topped vehicle cargo box includes a plurality of hard panels, each panel defining spaced apart upper and lower panel surfaces integrally joined by edge surfaces. Each adjacent pair of panels is pivotally interconnected by an elongated multi-pin hinge extending laterally between edge surfaces of the adjacent panels. The hinge comprising a first flange member carried with the panel edge surface, a second flange member carried with an adjacent panel edge surface, an elongated free-moving link mounted to the first flange for relative rotation with respect thereto about a first axis and mounted to the second flange for relative rotation with respect thereto about a second axis. The first axis is fixedly spaced from and parallel to the second axis, wherein the hinge is disposed between the upper and lower surfaces of the panels when the panels are in a deployed position, and wherein the hinge enables 180° relative rotation between the hinged adjacent panels between the deployed position and a retracted position.

These and other features and advantages of the disclosure will become apparent upon reading the following specification, which, along with the drawings, describes an embodiment of the disclosure in detail.

BRIEF DESCRIPTION OF THE DRAWINGS

The present apparatus will now be described, by way of example, with reference to the accompanying drawings, in which.

Figure 1:
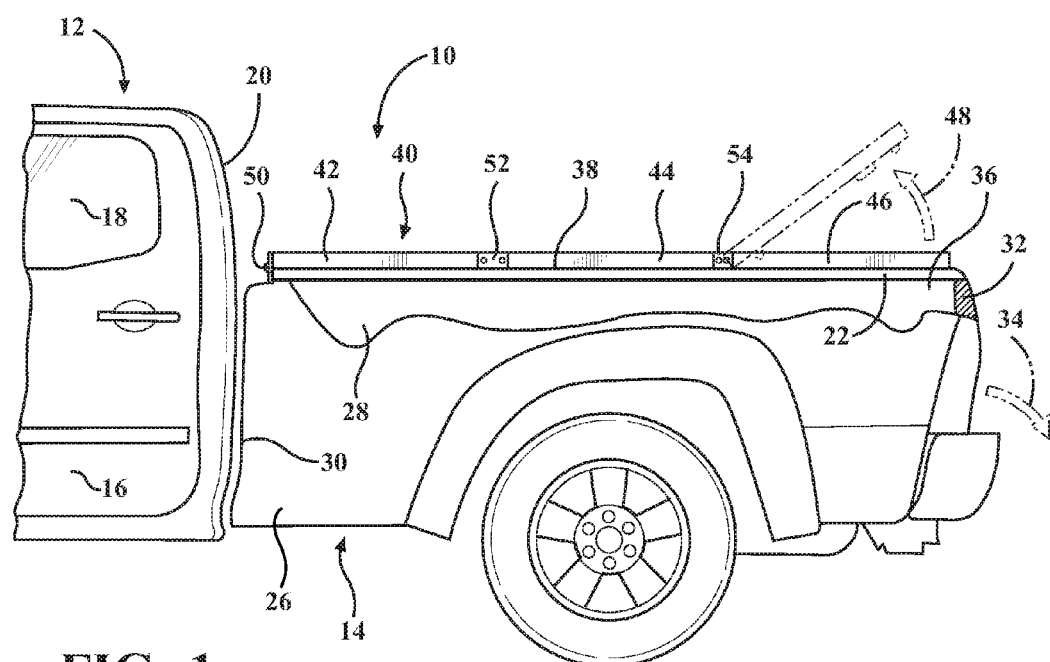
FIG. 1 is a left (e.g., driver's) side broken, elevation view of an exterior of a vehicle (e.g., pick-up truck) with an articulated, three panel tonneau cover consisting of a rear panel portion, a center panel portion and a front panel portion, in a deployed position fully covering an open topped bed, and the tonneau cover (in phantom) in an alternate, partially retracted position.

Although the drawings represent embodiments of the present apparatus and method, the drawings are not necessarily to scale and certain features may be exaggerated in order to illustrate and explain the present disclosure. The exemplification set forth herein illustrates an embodiment of the apparatus and method, in one form, and such exemplifications are not to be construed as limiting the scope of the present apparatus and method in any manner.

DETAILED DESCRIPTION

In the following detailed description, reference is made to the accompanying drawings, which form a part thereof, and in which is shown by way of illustrating specific embodiments in which the disclosure may be practiced. In this regard, directional terminology, such as "top", "bottom", "front", "back", "leading", "trailing", etc. is used with reference to the orientation of the Figures being described. Because components of embodiments can be positioned in a number of different orientations, the directional terminology is used for purposes of illustration and is in no way limiting. It is to be understood that other embodiments may be utilized and structural or logical changes may be made without departing from the scope of the present disclosure. Furthermore, the axes (e.g., ±X, ±Y, and ±Z axes) are referenced on the drawings to provide a relative directional sense only. The following detailed description, therefore, is not to be taken in a limiting sense, and the scope of the present disclosure is defined by the appended claims.

For purposes of providing a non-limiting definition and to enable clear understanding of the present disclosure, "longitudinal" means parallel to the direction of the Y axis, "lateral" means parallel to the direction of the X axis, and "vertical" means parallel to the direction of the Z axis.

The present disclosure describes a three piece, hard tonneau cover assembly which is selectively reconfigurable and removable. Each of the three panels is preferably formed of compression injection glass filled polypropylene. The compression injection molding process allows the use of thin walls (e.g., 2.5 mm) for a large panel size (e.g., 1.5 m×0.65 m), with minimal warp or molded stress. The inner and outer panel halves can be molded, cooled and then vibration welded together to create a panel portion. Welding ribs in the process create a box structure and the welding process flattens the panels to create a very flat shape (making it possible to achieve good appearance quality with such large, flat, thin resin panels).

Each panel assembly includes an aluminum cross beam in the center, and aluminum fore-aft side rails along the outboard edges. Such aluminum beams provide reinforcement against load (e.g., cross car beam), and against theft or aero induced lifting at the edges (i.e., side rails). There is an additional cross car beam at the rear of the rear panel to provide support when the tailgate is open. Although aluminum is described above, it is contemplated that any metal or alloy may be substituted and still be within the scope of the present disclosure.

Such construction is believed to be unique in application with tonneau covers. It achieves high strength against all loading conditions, is low cost to manufacture, and has high durability against ultraviolet (i.e., UV) exposure and bumping/scratching (i.e., PP resin UV stability and general toughness against impact and scratching in addition to aluminum beams for light weight structural support in the key areas).

The aluminum beams are sealed from environmental exposure by the welded resin panel assembly, saving the cost of corrosion protection (the aluminum beams can be raw extrusions, cut to length).

The present disclosure describes a three piece, hard tonneau cover assembly which includes six rotary latches (two per panel) which are utilized to securely attach the tonneau cover to the vehicle bed. Each latch has a primary and a secondary latch position.

Hinges disposed between the adjacent panels can be metal (e.g., aluminum extrusion), "piano hinge" type. A metal hinge is preferable for strength inasmuch as it provides a metal beam to help support the thermoplastic resin at elevated temperatures. Furthermore, being a continuous "piano hinge", it transmits loads between panels to further increase overall system strength.

The hinge design is believed to be unique for the present application in that the flange elements are common for the front and rear hinges, and only the central "link" and its covering seals are changed to create the narrow rear hinge and the wide front hinge shape. The aluminum is lightweight, as opposed to stainless steel employed in other known designs, but can require ecoat and paint to provide comparable corrosion resistance. Alternatively other known designs employ a rubber, "living" hinge which can tear and lose strength after heat exposure. The resin tonneau cover panels, and associated component parts are preferable UV stabilized, and confirmed to fade at similar rates to maintain OEM appearance throughout the life of the related vehicle system.

Some tonneau cover manufacturers employ typical piano hinges with a single pivot axis and a 180° range of motion, but this places the pivot point above the top surface of the tonneau cover, creating an aesthetically objectionable "bump". The present disclosure employs two 90° piano hinges in conjunction to provide the necessary range of motion, which avoiding the undesirable "surface bump". Other tonneau cover manufacturers employ extruded hinge sections which are telescoped together to reduce manufacturing costs, but creates a large sliding surface contact area between the two elements, and dust/dirt/corrosion can make the tactile feeling to the user to become rough, or materially increase the folding effort.

The tonneau cover assembly provides a release mechanism. To fold for vehicle bed access, or to fold the tonneau cover up for removal from the vehicle bed, each panel has a release handle simultaneously operating both latches. The handle is a simple shape designed for ergonomic ease of use. To assist the operation of the release mechanism, the release handle is positioned beneath its associated panel and is as near to the rear outward edge as possible. The release mechanism strength is scaled to support the weight of the overall tonneau cover panel which is deemed to be the maximum reasonable load possible to be exerted on it.

The tonneau cover opening process can follow the steps of (1.) unlocking the security lock and opening the tail-gate, (2.) rearwardly pull the rear panel release handle and fold the rear panel open atop the center panel, (3.) rearwardly pull the center panel release handle and fold the combined center panel and rear panel open atop the front panel, (4.) strap the folded rear, center and front panels together by engaging two male buckles into the associate female receptacles located at the front edge of the front panel, and (5.) pull the front panel release handle, and lift up the entire assembly and remove it from the vehicle bed.

The forgoing process can be accomplished by a single operator if they step inside the vehicle bed during the removal process. The entire assembly can weigh 31 kg in a "long bed" configuration and 27 kg in a "short bed" configuration.

The release handles are preferably located toward the driver's side of the vehicle. The release handles are preferably surrounded by an anti-theft protective wall to prevent access when the tailgate is closed and secured with a locking mechanism (not illustrated). The entire release mechanism is enclosed to prevent theft access when the tonneau cover is closed. The nominal handle stroke can be 30 mm. Pulling the handle pulls on an associated cable, which strokes the associated pair of latches to simultaneously release the associated tonneau cover panel from the vehicle bed.

Figure 3:
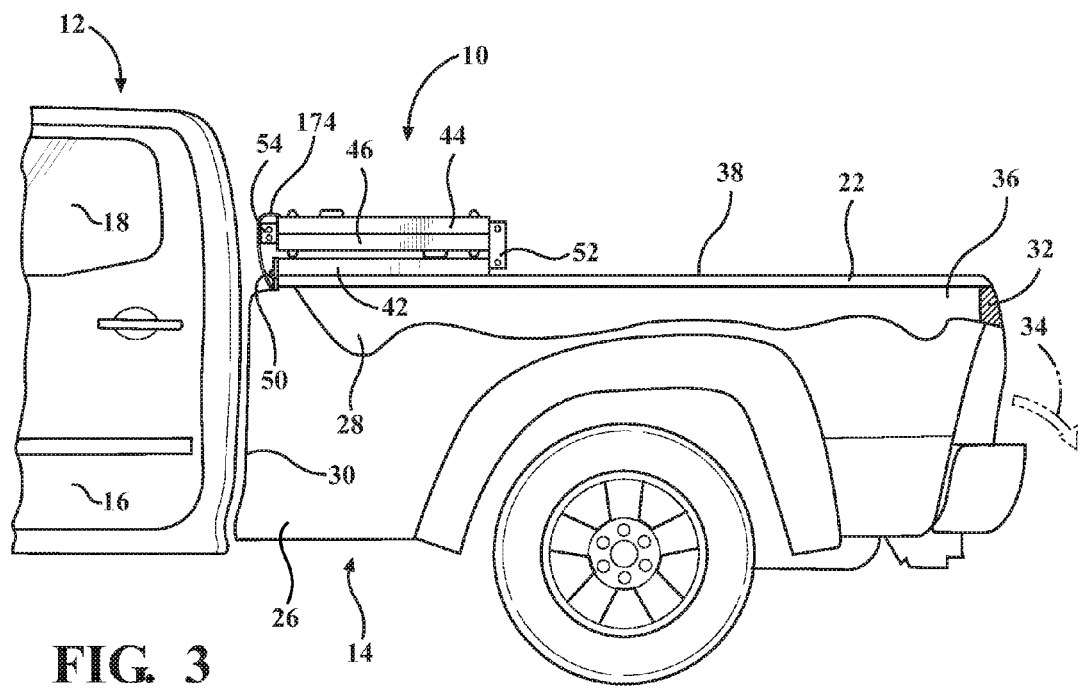
FIG. 3 is a left side broken elevation view of the exterior of the vehicle (e.g., pick-up truck) of FIG. 1, with the tonneau cover in a fully folded position wherein the center panel portion overlays the rear panel portion which, in turn, overlays the front panel portion exposing the rear and center portions of the vehicle bed.

The bottom surface of each of the three tonneau cover panels is provided with drainage channels to resist water/ice collection around the release mechanisms or the latches if that panel of the tonneau cover is left open or exposed in the rain/snow, particularly the center panel, which faces upwardly when the tonneau cover is folded and strapped in the open position at the front of the bed, as illustrated in FIG. 3.

A perimeter seal is provided to sealingly engage with the outer peripheral edge of the tonneau cover where it mates with the vehicle bed rails in a full range of fitting tolerance variation. The seal is coated to prevent freezing water adhesion. In addition, an exterior "lip" is provided with the seal to deflect car wash spray from the sealing surface.

The tonneau cover system includes a pair of buckles and cooperating straps to hold the folded over assembly in a stable shape for handling. Refer FIGS. 3, 4 and 6. The straps are located on the front edge of the front panel. Resin "feet" are integrally formed on the underside of the tonneau cover panels for secure storage (i.e., they resist tipping over, and they resist damage/scratching to the hinge surface finish while resting on a rough concrete garage floor.

Based upon high speed blow off performance testing with the front panel unlatched and wind lift of the front panel and slamming it against the center panel, a maximum force of 3000 N was detected. This 3000 N loading level was employed to establish the latch, striker, bed rail and tonneau cover panel strength targets. Antitheft protection is provided with an "antitheft wall" all around the release assembly of the tonneau cover assembly.

The present disclosure provides a tonneau cover latch system which enables the tonneau cover to latch into a "half latch" position with the vehicle bed based upon the weight of the tonneau cover alone and without the application of any inertial (i.e., "slamming") forces.

Each latch mechanism includes a primary (e.g., half latch) function which meets a 3000 N strength specification, and is engaged by the weight of an associated panel alone before any weather strip compression. Each latch mechanism includes a ratchet, pawl and release lever, and is protected by a polypropylene cover to minimize sharp edges. The latch mechanism includes a base scaled to support the entire mass of the tonneau cover dropped from 300 mm to the ground. This provides protection against latch damage during handling.

Each latch mechanism includes a rotary latch design and a "headed" striker pin to prevent each latch from sliding axially off the striker pin and fail. Using a rotary latch provides additional robustness to the overall function because they cannot slip off the end of the striker pin. As a result, a rotary latch can retain the tonneau cover even if its partner has failed. This is contrasted with a sliding latch which depends upon its opposing partner to retain engagement, and wherein failure of one sliding latch can cascade into release of its partner, and ultimately catastrophic failure of the entire system.

Each latch engages on a stud striker bolted to the bed rail. Because of limited space on the existing bed rail, a unique "stud" type striker was employed. The "stud", a cantilevered beam is employed instead of the usual "loop" shape frequently employed in other automotive latch applications such as door latches, luggage latches, hood latches and trunk latches. The head striker of the present disclosure requires scaling for maximum loading under impact throughout its intended life to counter blow off load while driving at high speed, fatigue durability during rough road operation, and during operator induced hard open/close durability. The large diameter head of the striker stud is larger than the width of the latch mouth, preventing it from being able to axially slip off the end.

Figure 7:
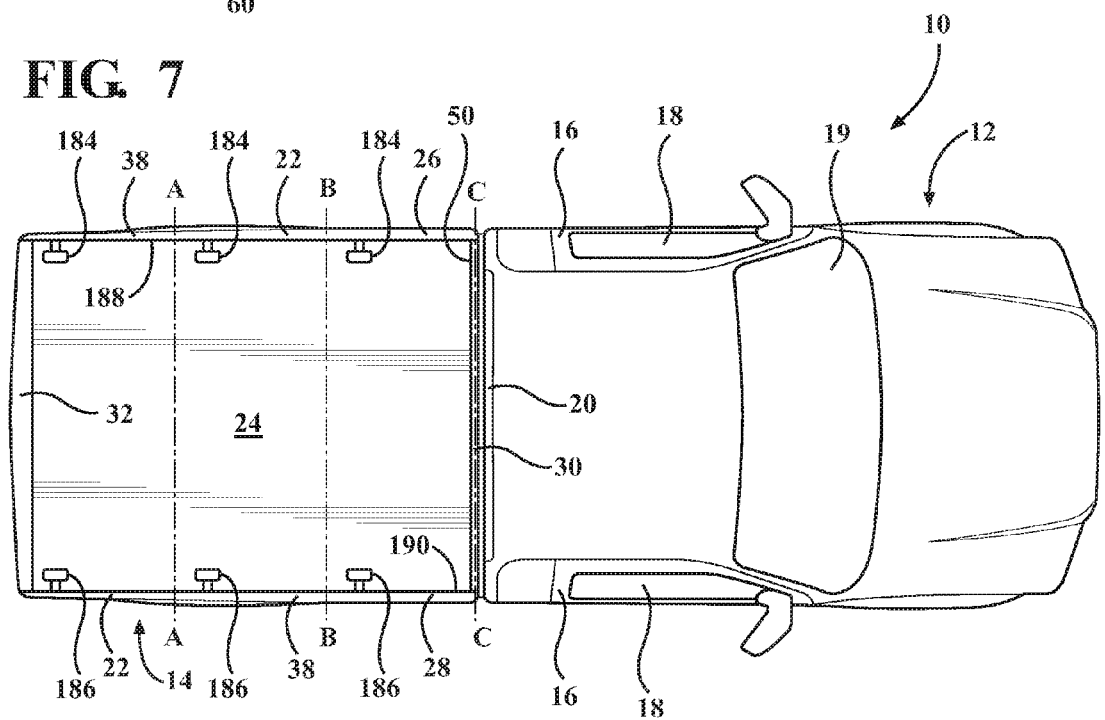
FIG. 7 is an overhead view of the vehicle of FIG. 1 with the tonneau panel portions removed, exposing three sets of laterally inwardly directed panel latch striker pins carried with the vehicle bed and the respective rotational axes of the panel portions juxtaposed with the vehicle bed.

Referring to FIGS. 1 and 7, a motor vehicle (e.g., a pick-up truck) 10 includes a cab portion 12 and an open topped bed portion 14. The cab portion 12 includes occupant access doors 16, a windshield 19, side windows 18 and a rear window 20. The rear window 20 typically can be selectively opened and closed by occupants of the cab portion 12 of the pick-up truck 10 for ventilation, as well as communication and passing objects between the cab portion 12 and the open topped bed portion 14 of the pick-up truck 10.

The open topped bed portion 14 is positioned behind the cab portion 12, and is typically a box-like structure including a generally rectangular floor panel 24, longitudinally extending left and right opposed side wall panels 26 and 28, respectively, a laterally extending front end panel 30 and a laterally extending rear tailgate panel 32. The side wall panels 26 and 28 as well as the front end panel 30 are typically permanently affixed to the floor panel 24 and one another in their respective illustrated positions. The lowermost edge of the tail gate panel 32 is attached to remainder of the open topped bed portion 14 by hinges (not illustrated) to permit opening/closing as suggested by an arrow 34 for providing user access to an interior cavity 36 defined by the open topped bed portion 14 of the pick-up truck 10.

The left and right side wall panels 26 and 28, respectively, the front end panel 30 and the tailgate panel 32 support a bed rail cap 22 extending about the periphery of the bed portion 14 and forming uppermost edge surfaces falling on a common horizontal plane designated as a tonneau cover support surface 38. A tonneau cover 40 is carried atop the tonneau cover support surface 38. The tonneau cover 40 consists of three rigid panel portions, a front panel portion 42, a center panel portion 44 and a rear panel portion 46, each extending between the left and right side wall panels 26 and 28, respectively, and collectively extending longitudinally to enclose the interior cavity 36 of the open topped bed portion 14 of the pick-up truck 10. The leading lateral edge of the forward most panel portion 42 is selectively connected to front end panel 30 of the open topped bed portion 14 by a release pin 50 or similar device. The trailing lateral edge of the forward most panel portion 42 is interconnected to the leading lateral edge of the center panel portion 44 by a first laterally extending piano-type biaxial elongated hinge 52. The trailing lateral edge of the center panel 44 is interconnected to the leading lateral edge of the rear panel portion 46 by a second laterally extending piano-type biaxial elongated hinge 54.

Figure 2:
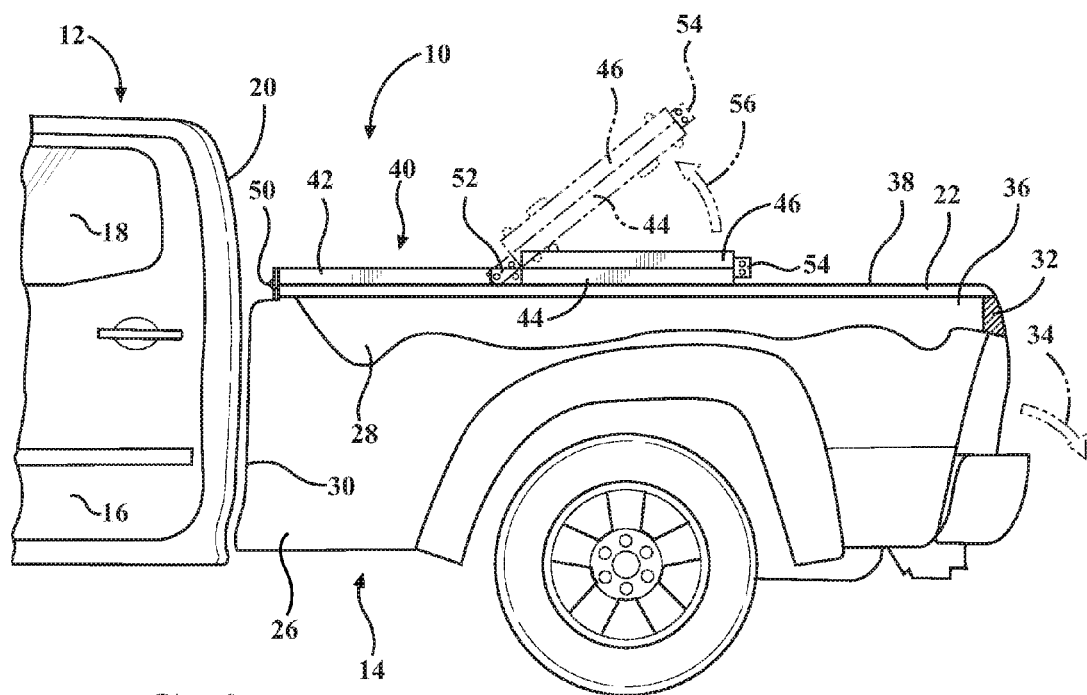
FIG. 2 is a left side broken elevation view of the exterior of the vehicle (e.g., pick-up truck) of FIG. 1, with the tonneau cover in an intermediate partially folded position wherein the rear panel portion overlays the center panel portion exposing the rearmost portion of the vehicle bed, and additionally (in phantom) in an alternate, partially further retracted position.
Figure 4:
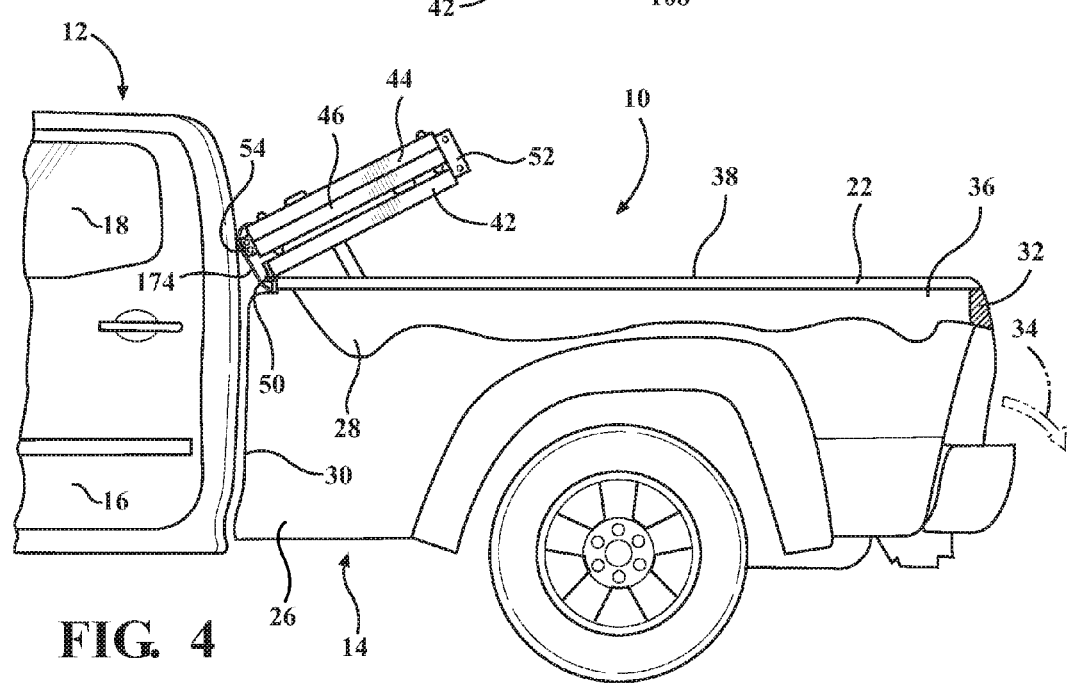
FIG. 4 is a left side broken elevation view of the exterior of the vehicle (e.g., pick-up truck) of FIG. 3, with the fully folded tonneau cover positioned for removal from the vehicle bed.

As illustrated in FIG. 1, the tonneau cover 40 is depicted in a deployed position in which the entire interior cavity 36 of the bed portion 14 is covered. To gain access to the interior cavity 36 of the open topped bed portion 14 of the pick-up truck 10, an operator sequentially displaces the panel portions 46, 44 and 42 about biaxial hinges 54 and 52 as illustrated in phantom in FIGS. 1 and 2. Specifically, rear panel portion 46 is first rotated counter clockwise about the axes of biaxial hinge 54 as suggested by arrow 48. The rotation of rear panel portion 46 can continue until it lies atop the center panel portion 44 as illustrated in FIG. 2, providing hands-free access to the rear portion of the interior cavity 36 of the bed portion 14. To gain hands-free access to the center portion of the interior cavity 36, the rear and center panel portions 46 and 44 are rotated in unison counter clockwise about the axes of biaxial hinge 52 as suggested by arrow 56 until they lay atop the front panel portion 42 as illustrated in FIG. 3. To gain hands-free access to the front portion of the interior cavity 36, the rear, center and front panel portions 46, 44 and 42 are rotated in unison counter clockwise about the about the release pin 50 as illustrated in FIG. 4. Prior to operation of the vehicle 10, the folded tonneau cover 40 should be removed from the vehicle 10 by pulling a handle 96 of FIG. 5 and placing the folded tonneau cover 40 in remote storage or, alternatively, to the intermediate position with strap 174 secured as illustrated in FIG. 3.

FIGS. 2 and 3 illustrate the tonneau cover 40 in alternative retracted positions. Suitable fasteners can be employed to robustly retain the tonneau cover 40 to the open topped bed portion 14 of the pick-up truck 10, both in the deployed position and the alternative retracted positions.

Figure 5:
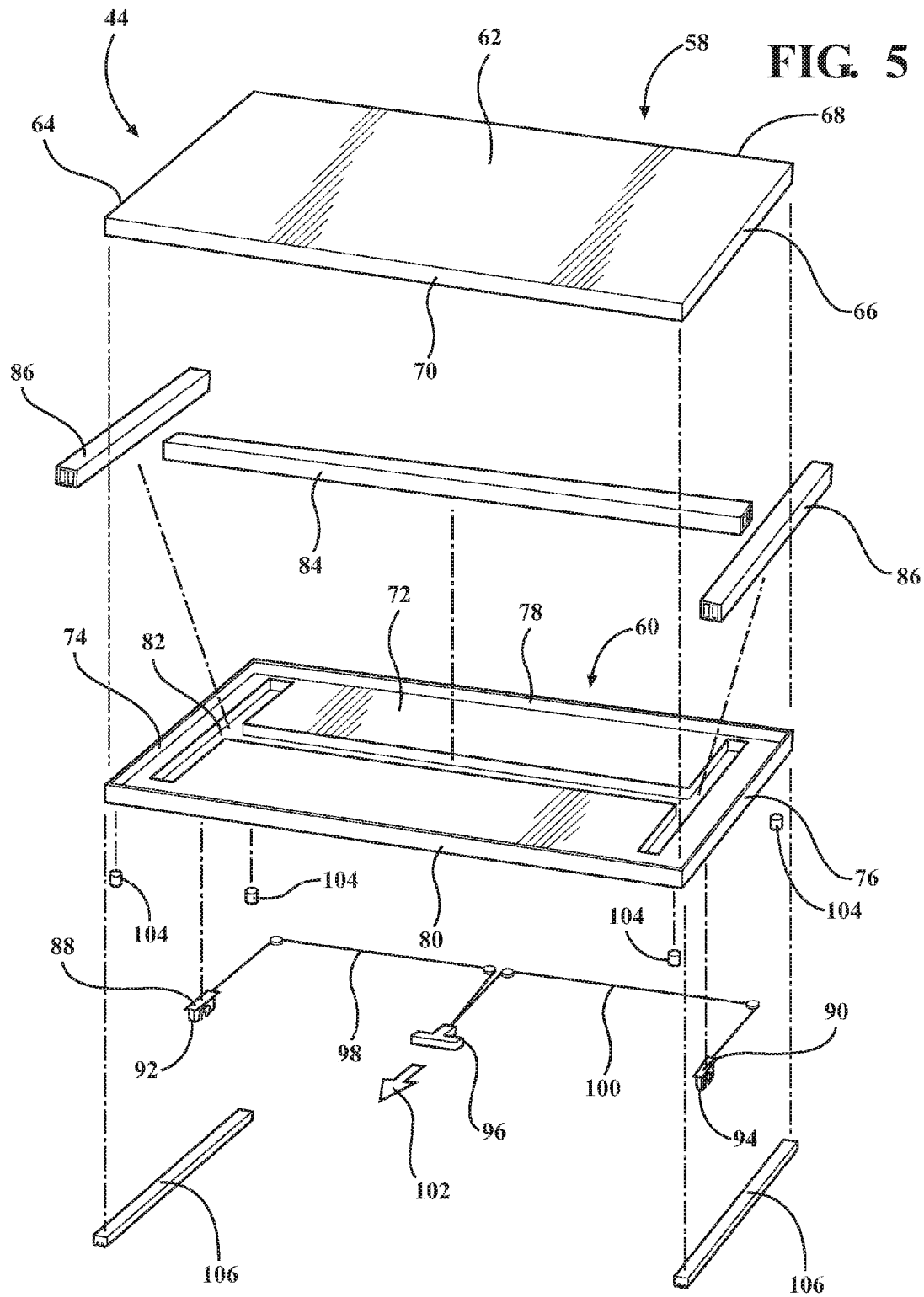
FIG. 5 is an exploded, perspective view of a representative one of the rear, center and front panel portions of the tonneau cover of FIG. 1 illustrating interior and underside details thereof.

Referring to FIG. 5, a representative view of one of the front, center and rear tonneau panel portions 42, 44 and 46, respectively, illustrates, in exploded view, structural details. For simplicity, the center panel portion 44 is described, including an upper panel half 58 and a lower panel half 60 preferably formed of compression injection glass filled polypropylene. The upper panel half 58 integrally forms an exposed decorative upper surface 62, laterally opposed, longitudinally extending left and right side wall segments 64 and 66, respectively, and longitudinally opposed, laterally extending front and rear side wall segments 68 and 70, respectively. The lower panel half 60 integrally forms a lower surface 72, laterally opposed, longitudinally extending left and right side wall segments 74 and 76, respectively, and longitudinally opposed, laterally extending front and rear side wall segments 78 and 80, respectively. The lower surface 72 of the lower panel half 60 has an H-shaped recess or guide 82 formed therein for positioning and retaining a centrally located lateral support member 84 and an opposed pair of longitudinal support members 86. The support members 84 and 86 are preferably formed of raw extruded aluminum tube material for enhanced strength and reduced costs.

The wall segments 64-70 of the upper panel half 58 are joined to the wall segments 74-80 of the lower panel half 60, such as by friction welding, to affect a hermetically sealed cavity encapsulating the support members 84 and 86.

Left and right two stage rotary latch mechanisms 88 and 90 are affixed to and extend below the lower surface 72 of the central panel portion 44. The latch mechanisms 88 and 90 each have a release member 92 and 94, respectively, interconnected to a common release handle 96 via cables 98 and 100. The panel 44 can be manually released from engagement with the bed portion 14 of the vehicle 10 by pulling the release handle 96 as indicated by arrow 102.

Resilient corner bumpers 104 are affixed to and extend below each corner of the lower surface 72 of the central panel portion 44 to position the center panel portion 44 of the tonneau cover 40 with respect to the adjacent bed rail cap 22 when in the deployed position. Perimeter weather-strip segments 106 affixed to and extend below the lower surface 72 of the central panel portion 44 along its lateral outer walls. The forgoing description of the center panel portion 44 also applies to the front panel portion 42 and the rear panel portion 46, with the exception that the front panel portion 42 also includes a perimeter weather-strip segment along its front wall and that rear panel portion 46 also includes a perimeter weather-strip segment along its rear wall. Thus, the aggregate tonneau cover 40 includes a continuous weather-strip about its lower outer periphery sealingly engaging the underlying bed rail cap 22 when in the deployed position.

Figure 1A:
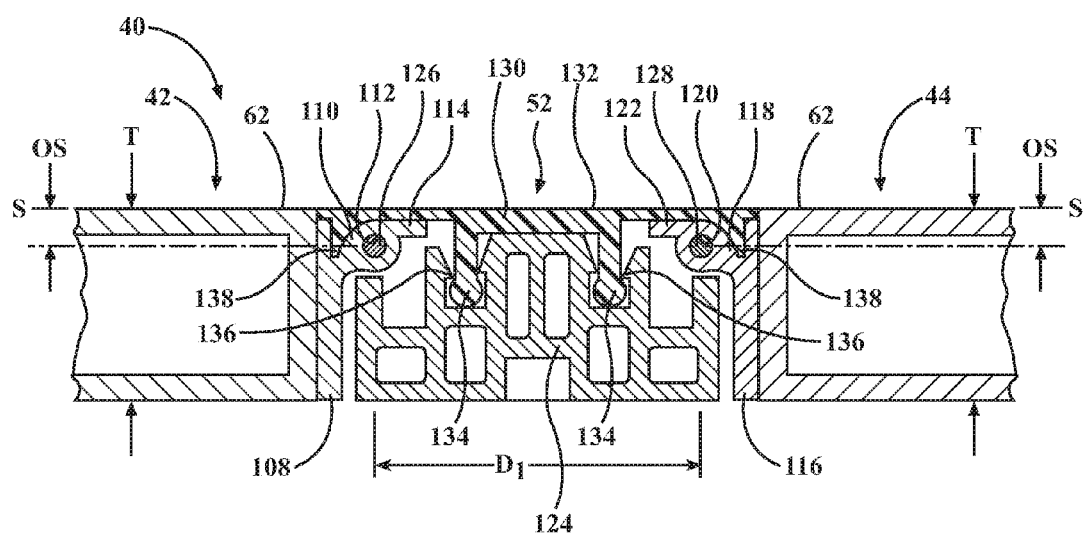
FIG. 1A is a broken, cross-sectional view, on an enlarged scale, of a laterally extending bi-axial hinge interconnecting the front and center panel portions of the tonneau cover of FIG. 1.

Referring to FIG. 1A, the first biaxial hinge 52 interconnects the rear edge of the front panel portion 42 with the front edge of the center panel portion 44 of the tonneau cover 40. The first hinge 52 includes a first flange member 108 affixed to the front panel portion 42 forming a succession of laterally spaced apart hinge pin receiving extensions (only one is illustrated) 110 including a hinge pin receiving bore 112 and longitudinally extending rotation limiting tang 114. The first flange 108 preferably extends laterally the entire extent of the front panel portion 42. The hinge pin receiving extensions 110 are positioned vertically below the upper surface 62 of the front panel portion 42. The first hinge 52 further includes a second flange member 116 affixed to the center panel portion 44 forming a succession of laterally spaced apart hinge pin receiving extensions (only one is illustrated) 118 including a hinge pin receiving bore 120 and a longitudinally extending rotation limiting tang 122. The second flange 116 preferably extends laterally the entire extent of the center panel portion 44. The hinge pin receiving extensions 118 are positioned vertically below the upper surface 62 of the center panel portion 44. The tangs 114 and 122 form cooperating abutment surfaces with respective adjacent contact portions of a link 124 explained in further detail below. The first and second flanges 108 and 116, respectively, are preferable formed of extruded aluminum.

The first hinge 52 includes an elongated, free-moving link 124, preferably formed of extruded aluminum and extending laterally the common entire extent of the front and center panel portions 42 and 44, respectively. The link 124 is preferably formed in a box-like honeycomb configuration to provide torsional and beam loading strength independent of its relative rotational position with respect to the bed portion 14 of the vehicle 10. As illustrated in FIG. 1A, the link 124 forms a first succession of laterally spaced apart hinge pin receiving extensions (not illustrated) including hinge pin receiving bores (not illustrated) positioned to axially register with the hinge pin bores 112 of the first flange 108. In addition, the link 124 forms a second succession of laterally spaced apart hinge pin receiving extensions (not illustrated) including hinge pin receiving bores (not illustrated) positioned to axially register with the hinge pin bores 120 of the second flange 116.

Figure 3A:
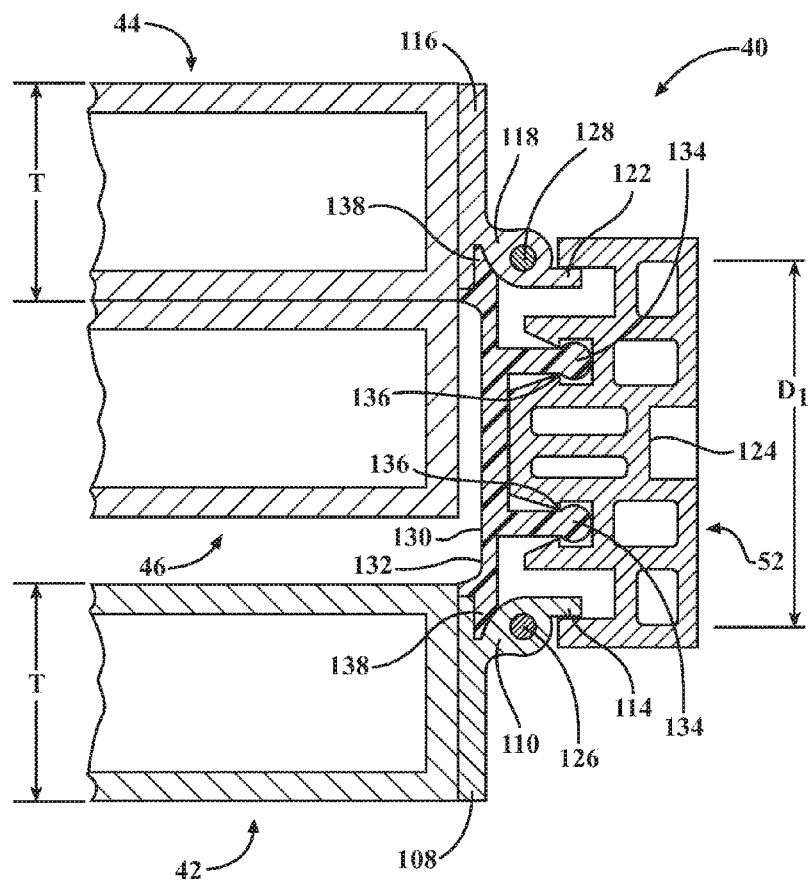
FIG. 3A is a broken, cross-sectional view, on an enlarged scale, of the laterally extending bi-axial hinge interconnecting the front and center panel portions of the tonneau cover configured as illustrated in FIG. 3.

A first hinge pin 126 extends laterally through the aligned bores 112 of the first flange 108 and the associated bores of the link 124. A second hinge pin 128 extends laterally through the aligned bores 120 of the second flange 116 and the associated bores of the link 124. Referring to FIGS. 1A and 3A, the first hinge pin 126 extends laterally through the aligned bores 112 of the first flange 108 and the associated bores of the link 124 providing a degree of rotational freedom between the first panel portion 42 and the hinge link 124 which is limited to 90° by the tang 114. Likewise, the second hinge pin 128 extends laterally through the aligned bores 120 of the second flange 116 and the associated bores of the link 124 providing a degree of rotational freedom between the center panel portion 44 and the hinge link 124 which is limited to 90° by the tang 122. In the aggregate, the first biaxial hinge 52 provides a 180° freedom of rotation, while providing a vertical spacing equivalent to dimension $D_1$ equating to the spacing between the axes of the two parallel hinge pins 126 and 128. The axes of the two parallel hinge pins 126 and 128 are offset by a dimension designated OS from the upper surface 62. The nominal thickness of each of the panel portions 42, 44 and 46 are designated by the dimension T.

A hinge cover 130 forms a flexible rubber seal overlying the first biaxial hinge 52. The hinge cover 130 forms an upper surface 132 which is substantially coplanar with the upper surfaces 62 of the front panel portion 42 and the center panel portion 44 of the tonneau cover 40. The hinge cover 130 extends laterally the entire extent of the panel portions 42 and 44 and includes a plurality of integral retention tabs 134 extending within recesses formed in the link 124 forming retention surfaces 136 and a plurality of integral retention tabs 138 extending within recesses formed within the first and second flanges 108 and 116. Thus configured, the entire upper surface 62 of the tonneau cover 40 falls substantially on a common plane designated S-S when in the deployed position, rendering the first biaxial hinge 52 essentially invisible to an observer.

Figure 1B:
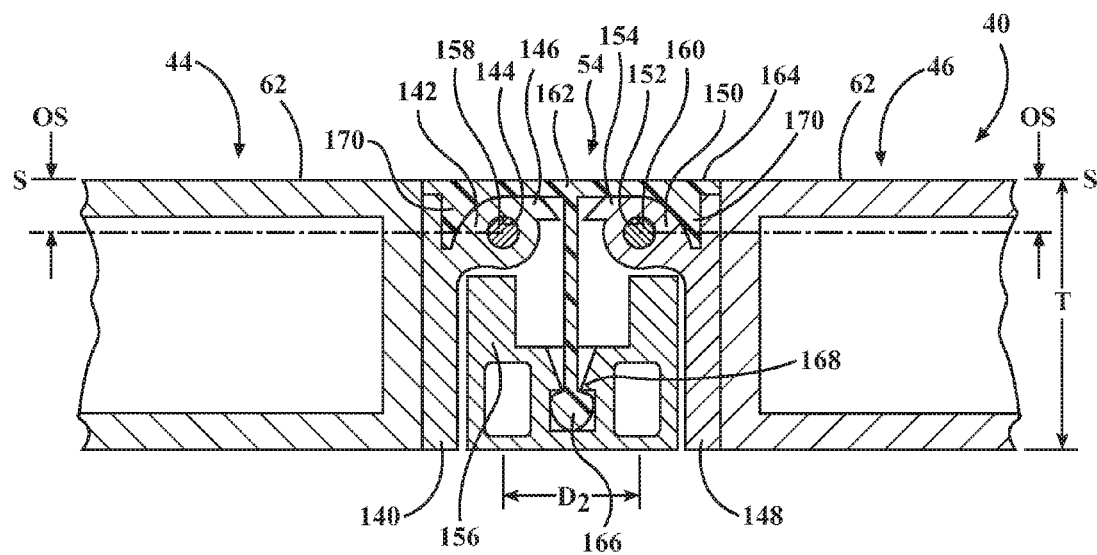
FIG. 1B is a broken, cross-sectional view, on an enlarged scale, of a laterally extending bi-axial hinge interconnecting the center and rear panel portions of the tonneau cover of FIG. 1.

Referring to FIG. 1B, the second biaxial hinge 54 interconnects the front edge of the center panel portion 44 with the rear edge of the rear panel portion 46 of the tonneau cover 40. The second hinge 54 includes a first flange 140 affixed to the center panel portion 44 forming a succession of laterally spaced apart hinge pin receiving extensions (only one is illustrated) 142 including a hinge pin receiving bore 144 and a longitudinally extending rotation limiting tang 146. The first flange 140 preferably extends laterally the entire extent of the center panel portion 44. The hinge pin receiving extensions 142 are positioned vertically below the upper surface 62 of the center panel portion 44. The second hinge 54 further includes a second flange 148 affixed to the rear panel portion 46 forming a succession of laterally spaced apart hinge pin receiving extensions (only one is illustrated) 150 including a hinge pin receiving bore 152 and a longitudinally extending rotation limiting tang 154. The second flange 148 preferably extends laterally the entire extent of the rear panel portion 44. The hinge pin receiving extensions 150 are positioned vertically below the upper surface 62 of the rear panel portion 46. The first and second flanges 140 and 148, respectively, are preferably formed of extruded aluminum.

The second hinge 54 includes an elongated link 156, preferably formed of extruded aluminum and extending laterally the common entire extent of the center and rear panel portions 44 and 46, respectively. The link 156 is preferably formed in a box-like honeycomb configuration to provide torsional and beam loading strength independent of its relative rotational position with respect to the bed portion 14 of the vehicle 10. As illustrated in FIG. 1B, the link 156 forms a first succession of laterally spaced apart hinge pin receiving extensions (not illustrated) including hinge pin receiving bores (not illustrated) positioned to axially register with the hinge pin bores 144 of the first flange 140. In addition, the link 156 forms a second succession of laterally spaced apart hinge pin receiving extensions (not illustrated) including hinge pin receiving bores (not illustrated) positioned to axially register with the hinge pin bores 152 of the second flange 148.

Figure 2A:
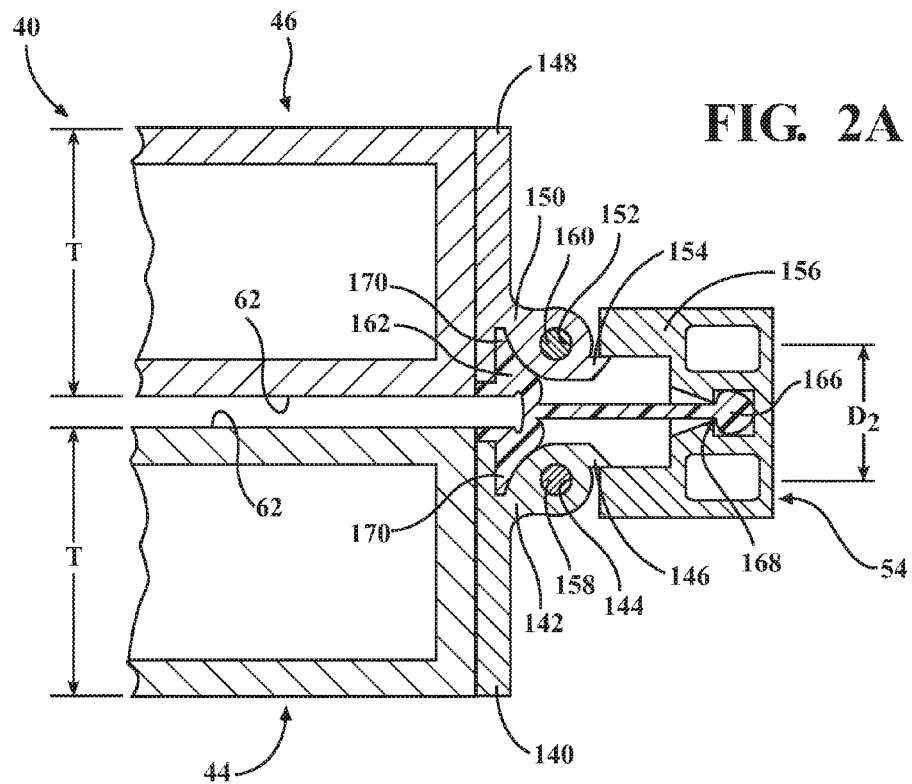
FIG. 2A is a broken, cross-sectional view, on an enlarged scale, of the laterally extending bi-axial hinge interconnecting the center and rear panel portions of the tonneau cover configured as illustrated in FIG. 2.

A first hinge pin 158 extends laterally through the aligned bores 144 of the first flange 140 and the associated bores of the link 156. A second hinge pin 160 extends laterally through the aligned bores 152 of the second flange 148 and the associated bores of the link 156. Referring to FIGS. 1B and 2A, the first hinge pin 158 extends laterally through the aligned bores 144 of the first flange 140 and the associated bores of the link 156 providing a degree of rotational freedom between the center panel portion 44 and the hinge link 156 which is limited to 90° by the tang 146. Likewise, the second hinge pin 160 extends laterally through the aligned bores 152 of the second flange 148 and the associated bores of the link 156 providing a degree of rotational freedom between the rear panel portion 46 and the hinge link 156 which is limited to 90° by the tang 154. In the aggregate, the second biaxial hinge 54 provides a 180° freedom of rotation between the center panel portion 44 and the rear panel portion 46 while providing a spacing equal to dimension $D_2$ equating to the spacing between the axes of the two parallel hinge pins 158 and 160. The nominal thickness of each of the panel portions 42, 44 and 46 are designated by the dimension T.

A hinge cover 162 forms a flexible rubber seal overlying the biaxial hinge 54. The hinge cover 162 forms an upper surface 164 which is substantially coplanar with the upper surfaces 62 of the center panel portion 44 and the rear panel portion 46 of the tonneau cover 40. The hinge cover 162 extends laterally the entire extent of the panel portions 44 and 46 and includes a plurality of integral retention tabs 166 extending within recesses formed in the link 124 forming retention surfaces 168 and a plurality of integral retention tabs 170 extending within recesses formed within the first and second flanges 140 and 148. Thus configured, the entire upper surface 62 of the tonneau cover 40 falls substantially on a common plane designated S-S when in the deployed position, rendering the second biaxial hinge 54 essentially invisible to an observer.

Figure 6:
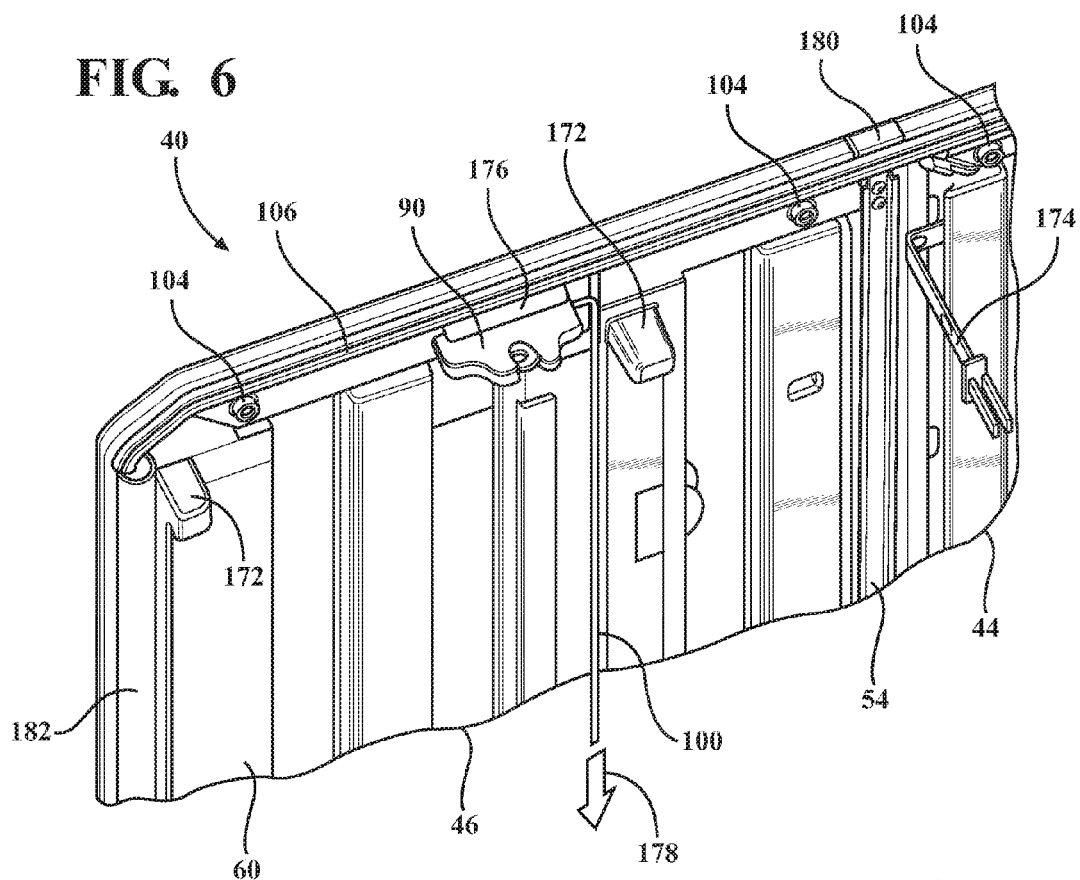
FIG. 6 is a broken, perspective view of the right (e.g., passenger's) side of the rear and center panel portions of the tonneau cover of FIG. 1, depicting underside details thereof.

Referring to FIG. 6, a broken perspective view of portions of the left sides of the center portion 44 and rear panel portion 46 of the tonneau cover 40 illustrate underside details. The lower half panel 60 of the rear panel portion 46 has four resilient corner bumpers 104 affixed thereto to avoid rattling in application and to ensure leveling of the rear panel portion 46 atop the tonneau cover support surface 38 defined by the bed rail cap 22. Four vertically downwardly extending formed feet 172 are integrally formed on the lower half panel 60 of the rear panel portion 46 to prevent scratches on the top of the front panel portion 42 when it is folded forward as depicted in FIG. 3. A buckle and strap hold down apparatus 174 is affixed to the lower half panel 60 of the rear panel portion 46 to releasably retain the rear panel portion 46 in its folded position atop the center panel portion 44 as illustrated in FIG. 2 during operation of the vehicle 10. Furthermore, the buckle and strap apparatus 174 operates to releasably retain the rear panel portion 46 and the center panel portion in their folded positions atop the front panel portion 42 as illustrated in FIG. 3 during operation of the vehicle 10 and after removal and storage of the folded tonneau cover 40 separately from the vehicle.

Figure 9:
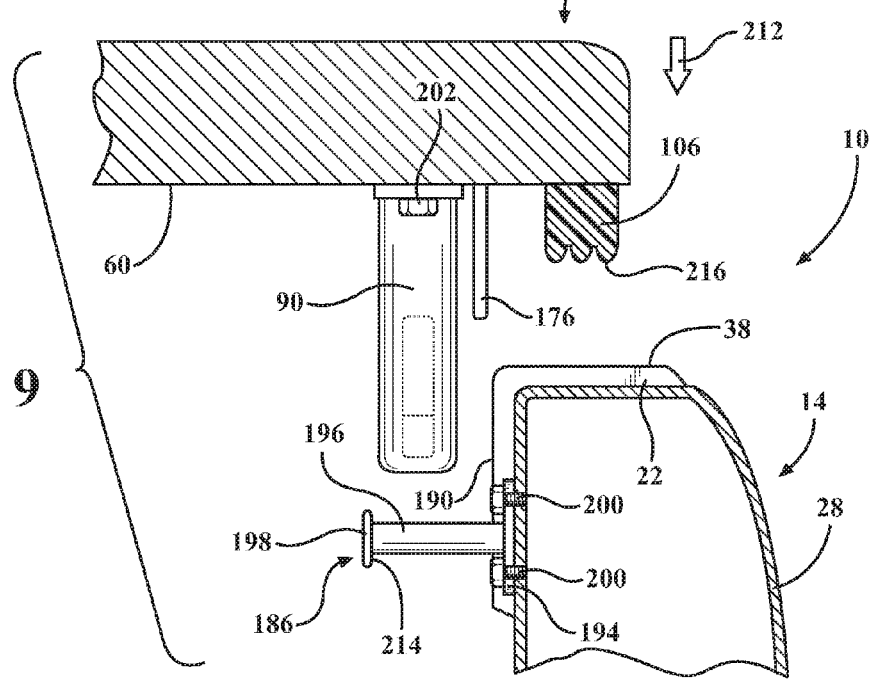
FIG. 9 is a broken, cross-sectional view of the striker pin of FIG. 8 supported by a bed rail of the vehicle box and aligned with the associated latch mechanism carried by an associated tonneau cover panel portion, and in the "full release" position.

Left and right two stage rotary latch mechanisms 88 and 90 are attached to each lower panel half 60 adjacent the left and right side wall segments 74 and 76, respectively, of each of the front, center and rear panel portions 42, 44 and 46, at locations longitudinally midway there along. Thus, each of the front, center and rear panel portions 42, 44 and 46 has an opposed pair of two stage rotary latch mechanisms 88 and 90 for separately releasably securing each panel portion 42, 44 and 46 to the bed rail cap 22. Each pair of two stage rotary latch mechanisms 88 and 90 are simultaneously released when an operator pulls the associated release handle 96 which, in turn, pulls the release cables 98 and 100 laterally inwardly as indicated by arrow 178. In addition, an anti-theft barrier wall 176 is integrally formed longitudinally adjacent an associated two stage rotary latch mechanism 88 and 90 and disposed laterally intermediate the associated two stage rotary latch mechanism 88 and 90 and an adjacent portion of the bed rail cap 22. Refer to FIGS. 6 and 9.

Perimeter weather strip segments 180 are interference fit within each end of the first and second biaxial hinges 52 and 54 to ensure continuous perimeter sealing in combination with perimeter weather strip segments 106 illustrated in FIG. 5. A vertically and longitudinally resilient perimeter weather strip segment 182 is mounted to the underside of the trailing edge of the rear panel portion 46 of the tonneau cover 40 to ensure sealing engagement with the upper edge surface of the rear tailgate panel 32.

Referring to FIG. 7, three opposed pairs of left and right headed striker pins 184 and 186, respectively, are rigidly affixed to inwardly facing opposed surfaces 188 and 190, respectively, of the bed rail cap 22. Each pair of headed striker pins 184 and 186 is longitudinally and laterally aligned with a mating pair of two stage rotary latch mechanisms 88 and 90 for releasable engagement therewith. Specifically, a first pair of headed striker pins 184 and 186 are located within the forward portion of the interior cavity 36 of the bed portion 14 for engagement with the pair of two stage rotary latch mechanisms 88 and 90 carried on the underside of the front panel portion 42 as it pivots about an axis C-C established by release pin 50. Furthermore, a second pair of headed striker pins 184 and 186 are located within the center portion of the interior cavity 36 of the bed portion 14 for engagement with the pair of two stage rotary latch mechanisms 88 and 90 carried on the underside of the center panel portion 44 as it pivots about an axis B-B established by the first biaxial hinge 52 Lastly, a third pair of headed striker pins 184 and 186 are located within the rear portion of the interior cavity 36 of the bed portion 14 for engagement with the pair of two stage rotary latch mechanisms 88 and 90 carried on the underside of the rear panel portion 46 as it pivots about an axis A-A established by the second biaxial hinge 54.

Figure 8:
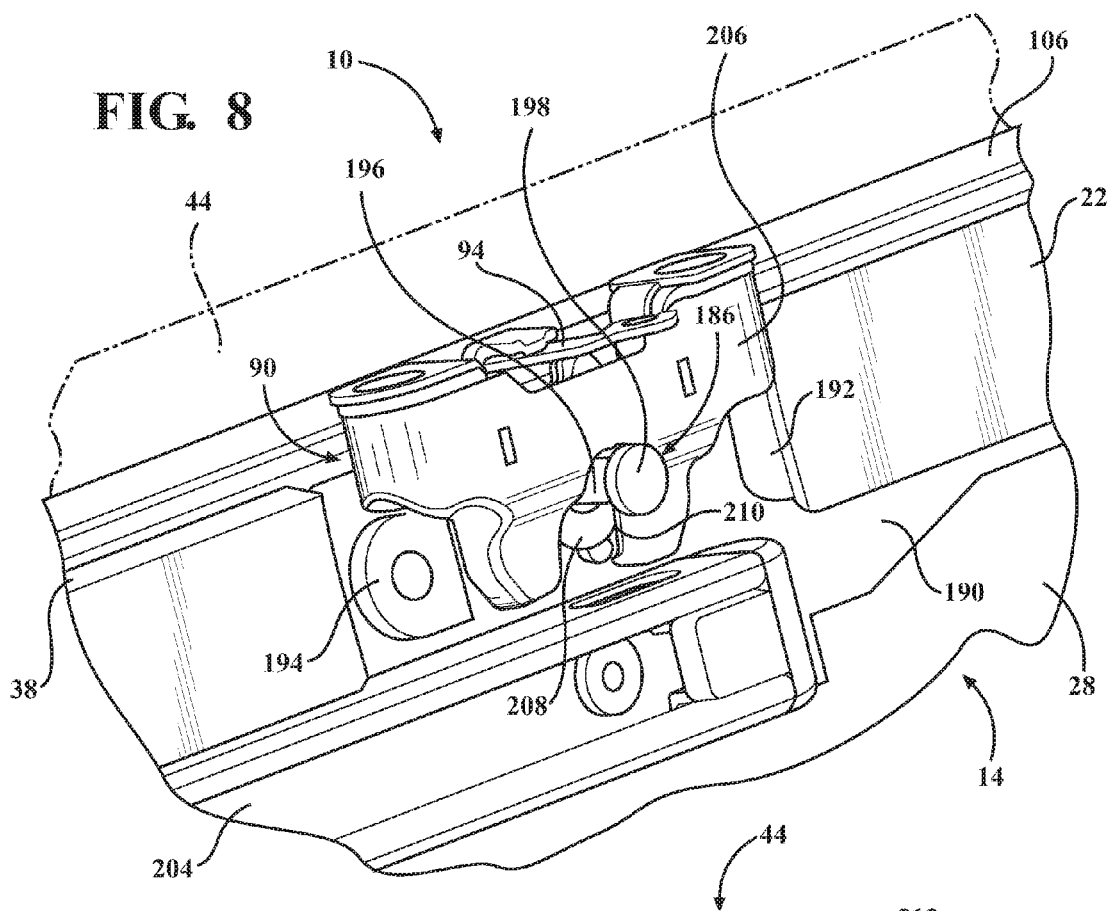
FIG. 8 is a broken, perspective view on an enlarged scale of a representative portion of the vehicle bed illustrating one of the striker pins of FIG. 7 juxtaposed with an associated latch mechanism carried with one of the tonneau cover panel portions (not illustrated)

Referring to FIGS. 8 and 9, the juxtipositioning of a representative headed striker pin 186 with an associated two stage rotary latch mechanism 90 in the pre-latched and latched position is illustrated. Each headed striker pin 186 is mounted within a notch 192 formed within the right side surface 190 of the bed rail cap 22 to establish an opening to receive the associated anti-theft barrier wall 176 therein (Refer FIG. 6). Each headed striker pin 186 includes a mounting flange 194, a laterally inwardly cantilevered shank portion 196 having a reduced nominal diameter ending in a head portion 198 having an enlarged nominal diameter. The headed striker pin 186 is secured to the bed rail cap 22 by bolts 200 or other suitable fasteners. Likewise, the associated two stage rotary latch mechanism 90 is secured to the lower panel half 60 of the center panel portion 44 by bolts 202 or other suitable fasteners. The bed rail cap 22 is configured to enable nearby mounting with a bed accessory rail 204 for securing cargo and accessories within the bed portion 14 of the vehicle 10 without interference with operation of the tonneau cover 40.

Referring to FIG. 8, each two stage rotary latch mechanism 90 includes a body or housing portion 206 enclosing a rotating pawl 208, a keeper (not illustrated) and a release member 94. The body 206 forms a tapered guide-way 210 which in operation, receives the shank portion 196 of the striker pin 186 and guides it into registration with the pawl 208 which rotates to capture the striker pin 186 in its illustrated position. The striker pin 186 is released by subsequent displacement of the release member 94 by operator induced cable actuation.

Figure 9A:
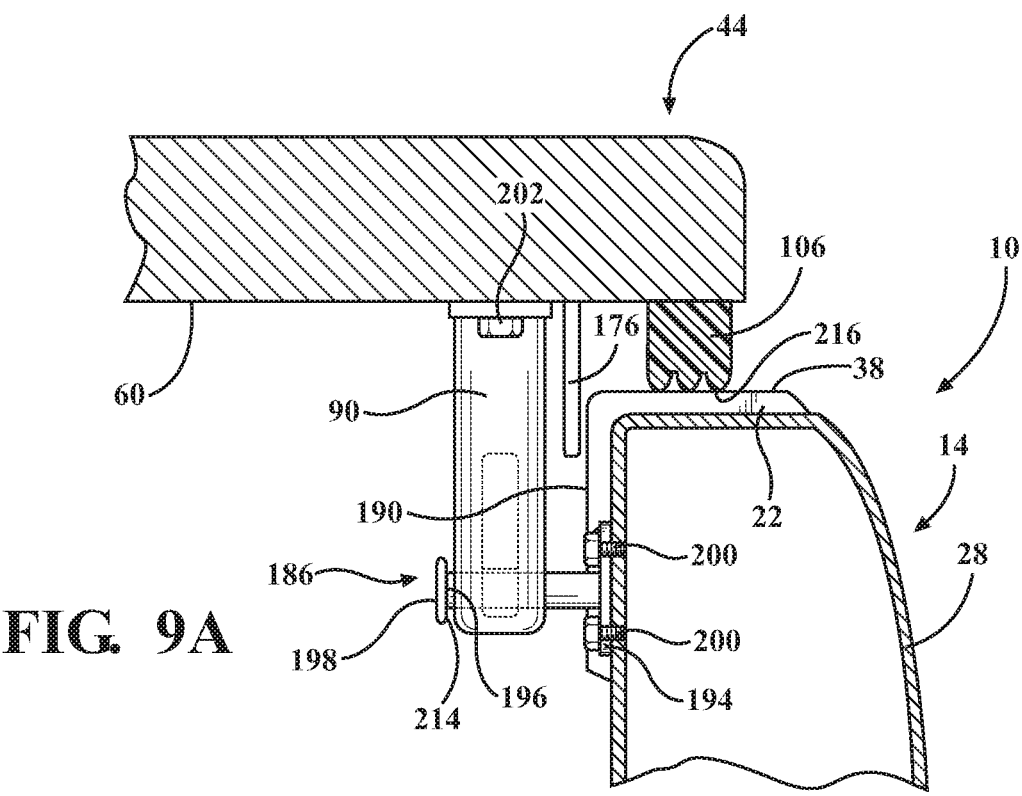
FIG. 9A is a broken, cross-sectional view of the latch mechanism of FIG. 9 in a "half latch" position.
Figure 9B:
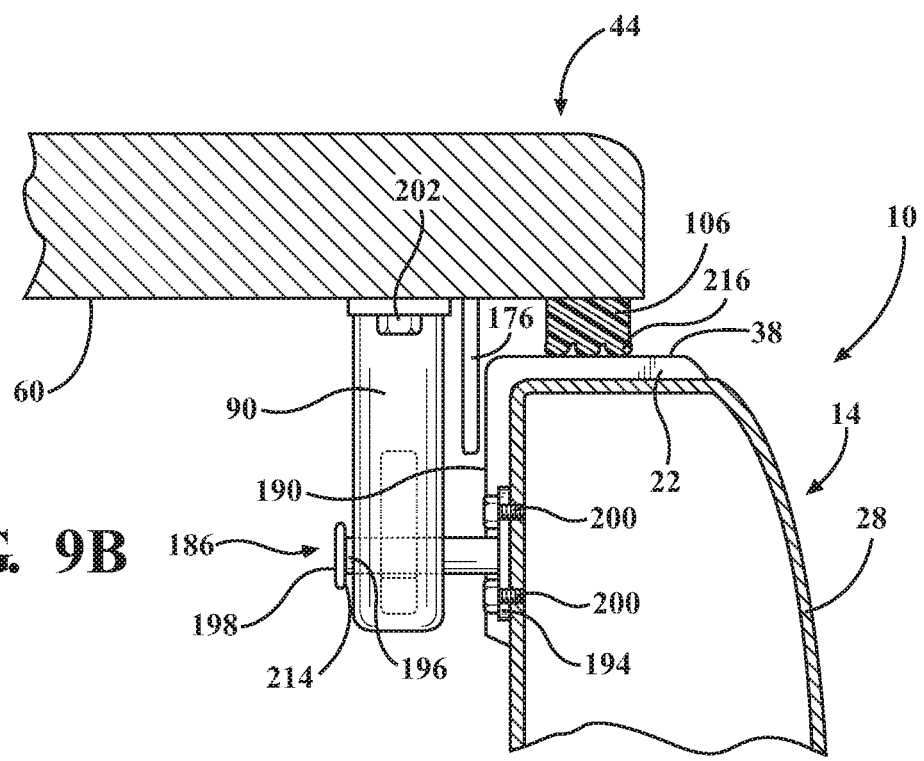
FIG. 9B is a broken, cross-sectional view of the latch mechanism of FIG. 9 in a "full latch" position.

Referring to FIGS. 8 and 9, as the center panel 44 is being manually displaced toward the closed position, as indicated by arrow 212, the twin stage rotary latch mechanism 90 and the anti-theft barrier wall 176 are laterally aligned between the outwardly facing surface 214 of the head portion 198 of the striker pin 186 and the inwardly facing surface 190 of the bed rail cap 22. Referring to FIG. 9A, as the leading surface 216 of the perimeter weather strip segment 106 first contacts the tonneau cover support surface 38, the pawl 208 rotates into a "half lock" position engaging, but not fully locking the center tonneau panel portion. At this point, the perimeter weather strip segment 106 is not yet compressed, and has not yet established a full seal. However, the perimeter weather strip segment 106 is robust enough to meet the specified "pull apart" specifications. The center tonneau panel portion 44 can be released from the condition depicted in FIG. 9A by an operator's repeated pull of the release handle 96 for reopening the tonneau cover 40. The "half latch" engagement depicted in FIG. 9A without the application of any downward operator force upon the center tonneau cover portion 44. The weight alone, without any added inertia, is sufficient to effect "half latch" of the two stage rotary latch mechanism 90. Referring to FIG. 9B, "full latch" engagement is effected by the application of sufficient downward force upon the center tonneau cover portion 44 to fully resiliently compress the perimeter weather strip segments 106, allowing the pawl 208 to further rotate and be lockingly engaged by the keeper. In this condition, the perimeter weather strip segments 106 are fully compressed to affect a weather tight seal, and the lower leading edge of the anti-theft barrier wall 176 has passed below the horizontal surface portion of the tonneau cover support surface 38 preventing external access to the two stage rotary latch mechanism 90. Release of the tonneau cover 40 can only be affected by first releasing and opening the (locked) tail gate panel 32.

It is to be understood that the present apparatus and method has been described with reference to specific embodiments and variations to provide the features and advantages previously described and that the embodiments are susceptible of modification as will be apparent to those skilled in the art.

Furthermore, it is contemplated that many alternative, common inexpensive materials can be employed to construct the basis constituent components. Accordingly, the forgoing is not to be construed in a limiting sense.

The present apparatus and method has been described in an illustrative manner, and it is to be understood that the terminology, which has been used is intended to be in the nature of words of description rather than of limitation.

Obviously, many modifications and variations of the present disclosure are possible in light of the above teachings. It is, therefore, to be understood that within the scope of the appended claims, wherein reference numerals are merely for illustrative purposes and convenience and are not in any way limiting, the present apparatus and method, which is defined by the following claims as interpreted according to the principles of patent law, including the Doctrine of Equivalents, may be practiced otherwise than is specifically described.

The invention claimed is:

1. A foldable tonneau cover apparatus for an open-topped vehicle cargo box, said tonneau cover apparatus comprising: first and second hard panels, each panel defining spaced apart upper and lower surfaces joined by edge surfaces, said panels pivotally interconnected by an elongated multi-pin hinge extending between adjacent edge surfaces of said first and second panels, said hinge comprising a first flange member carried with said first panel edge surface, a second flange member carried with said second panel edge surface, and an elongated free-moving link mounted to said first flange for relative rotation with respect thereto about a first axis and mounted to said second flange for relative rotation with respect thereto about a second axis, said first axis fixedly spaced from and parallel to said second axis, wherein said hinge is disposed between the upper and lower surfaces of said panels when said panels are in a deployed position with said upper surfaces thereof in a substantially coplanar orientation, wherein said first flange member includes a first tang configured to limit an amount of rotation of said first hard panel relative to said elongated free-moving link, said first tang being substantially parallel to said upper surface of said first hard panel.

2. The tonneau cover apparatus of claim 1, wherein said top surface of said first panel and said top surface of said second panel fall on a common plane when said tonneau cover is in said deployed orientation.

3. The tonneau cover apparatus of claim 1, wherein said first flange member is interconnected to said link by a first elongated hinge pin defining said first axis, and said second flange member is interconnected to said link by a second elongated hinge pin defining said second axis.

4. The tonneau cover apparatus of claim 1, wherein said first and second flange members are disposed vertically intermediate said upper and lower surfaces of said panels.

5. The tonneau cover apparatus of claim 1, wherein said free-moving link comprises a generally rectangular extruded tube operative to provide lateral support structure when said first and second panels are in the deployed position and in a retracted position.

6. The tonneau cover apparatus of claim 1, further comprising at least one latch mechanism carried with each said panel operable to selectively engage an associated vehicle cargo box when in said deployed position.

7. The tonneau cover apparatus of claim 1, further comprising a hold-down apparatus operable to interconnect and retain said first and second panels in a retracted position.

8. The tonneau cover apparatus of claim 1, where each said panel comprises an upper panel half and a lower panel half joined to form a sealed cavity enclosing at least one support member.

9. The tonneau cover apparatus of claim 1, wherein said first tang is configured to limit the relative rotation of said first hard panel with the free-moving link via cooperating abutment surfaces formed on said first flange member and said free-moving link.

10. The tonneau cover apparatus of claim 9 wherein said first tang is configured to limit the relative rotation of said first hard panel with the free-moving link to about 90°.

11. The tonneau cover apparatus of claim 1, wherein said second flange member includes a second tang configured to limit an amount of rotation of said second hard panel relative to said elongated free-moving link, wherein said second tang is substantially parallel to said upper surface of said second hard panel.

12. The tonneau cover apparatus of claim 11, wherein said first tang and said second tang are substantially parallel in said deployed position.

13. The tonneau cover apparatus of claim 1, wherein said first and second axes are offset from their respective upper panel surface by a dimension designated OS.

14. The tonneau cover apparatus of claim 13, wherein said first and second axes are offset from one another by a dimension designated $D_2$ which is equal to or greater than the dimension designated OS.

15. The tonneau cover apparatus of claim 13, wherein said first and second panels have a common nominal thickness of a dimension designated T.

16. The tonneau cover apparatus of claim 15, wherein said first and second axes are offset from one another by a dimension designated D1 which is equal to or greater than two times the dimension designated OS plus the dimension T.

17. A foldable tonneau cover apparatus for an open-topped vehicle cargo box, said tonneau cover apparatus comprising:
   first and second hard panels, each panel defining spaced apart upper and lower surfaces joined by edge surfaces;
   an elongated multi-pin hinge pivotally interconnecting and extending between adjacent edge surfaces of said first and second hard panels, said hinge comprising a first flange member carried with said first panel edge surface, a second flange member carried with said second panel edge surface, and an elongated free-moving link mounted to said first flange for relative rotation with respect thereto about a first axis and mounted to said second flange for relative rotation with respect thereto about a second axis, said first axis fixedly spaced from and parallel to said second axis; and
   a resilient hinge cover carried with said hinge and defining a planar upper surface which is substantially flush with the upper surfaces of said first and second panels when said tonneau cover is in a deployed position,
   wherein said hinge is disposed between the upper and lower surfaces of said panels when said panels are in said deployed position.

18. The tonneau cover apparatus of claim 17, wherein said hinge cover and flange members comprise cooperating retention features.

19. The tonneau cover apparatus of claim 17, wherein said hinge cover and link comprise cooperating retention features.

20. A foldable tonneau cover apparatus for an open-topped vehicle cargo box, said tonneau cover apparatus comprising:
   first and second panels, each panel defining spaced apart upper and lower surfaces joined by edge surfaces;
   a hinge pivotally connecting said first and second panels, said hinge comprising a first flange member carried with said first panel edge surface, a second flange member carried with said second panel edge surface, and a free-moving link mounted to said first flange for relative rotation with respect thereto about a first axis and mounted to said second flange for relative rotation with respect thereto about a second axis, said first axis fixedly spaced from and parallel to said second axis; and
   a hinge cover carried with said hinge and defining a substantially planar upper surface which is substantially flush with the upper surfaces of said first and second panels when said tonneau cover is in a deployed position.

21. A foldable, hard panel tonneau cover apparatus for an open-topped vehicle cargo box, said tonneau cover apparatus comprising:
   a plurality of hard panels, each panel defining spaced apart upper and lower panel surfaces integrally joined by edge surfaces;
   an elongated multi-pin hinge pivotally interconnecting and extending laterally between edge surfaces of said adjacent panels, said hinge comprising a first flange member carried with said panel edge surface, a second flange member carried with an adjacent panel edge surface, an elongated free-moving link mounted to said first flange for relative rotation with respect thereto about a first axis and mounted to said second flange for relative rotation with respect thereto about a second axis, said first axis fixedly spaced from and parallel to said second axis, wherein said hinge is disposed between the upper and lower surfaces of said panels when said panels are in a deployed position, and wherein said hinge enables 180° relative rotation between said hinged adjacent panels between said deployed position and a retracted position; and
   a resilient hinge cover carried with said hinge and defining a planar upper surface which is substantially flush with the upper surfaces of said adjacent hinged panels when said tonneau cover is in said deployed position.

* * * * *